Sept. 24, 1929.  E. R. JAGENBURG  1,729,269
FRUIT CUTTING MACHINE
Filed Dec. 10, 1924  5 Sheets-Sheet 1

INVENTOR
E. R. Jagenburg
BY C. P. Goepel
his ATTORNEY

Sept. 24, 1929.  E. R. JAGENBURG  1,729,269
FRUIT CUTTING MACHINE
Filed Dec. 10, 1924   5 Sheets-Sheet 3

INVENTOR
E.R.Jagenburg
BY
C.P.Goepel
his ATTORNEY

Sept. 24, 1929.   E. R. JAGENBURG   1,729,269
FRUIT CUTTING MACHINE
Filed Dec. 10, 1924   5 Sheets-Sheet 4

INVENTOR
E. R. Jagenburg
BY C. P. Goepel
his ATTORNEY

Sept. 24, 1929.  E. R. JAGENBURG  1,729,269
FRUIT CUTTING MACHINE
Filed Dec. 10, 1924   5 Sheets-Sheet 5
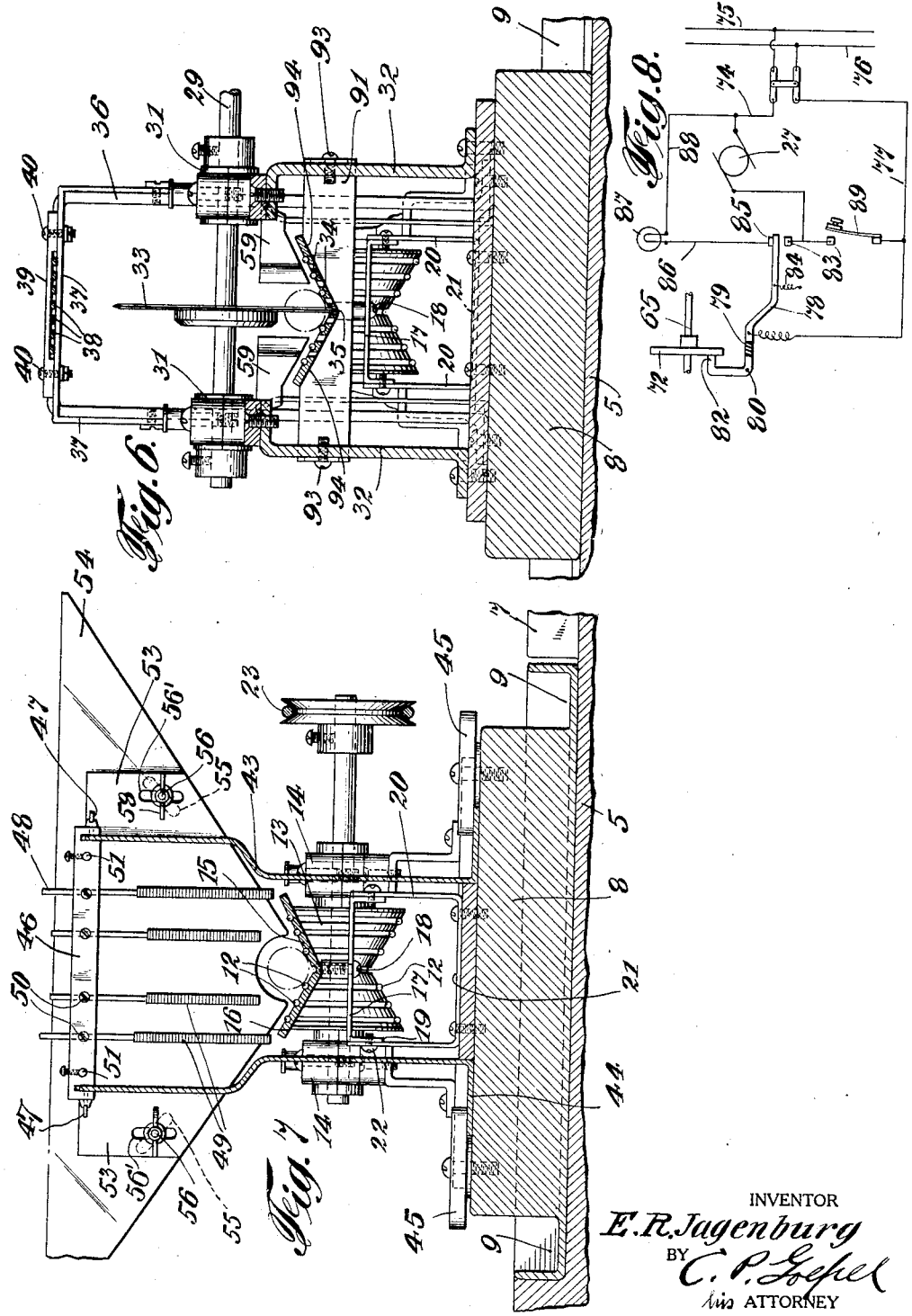
INVENTOR
E.R.Jagenburg
BY
C.P.Goehel
his ATTORNEY Patented Sept. 24, 1929

1,729,269

UNITED STATES PATENT OFFICE

EUGENE ROBERT JAGENBURG, OF NEW YORK, N. Y., ASSIGNOR TO CROWN FRUIT & EXTRACT CO., OF NEW YORK, N. Y., A CORPORATION OF NEW YORK

FRUIT-CUTTING MACHINE

Application filed December 10, 1924. Serial No. 754,906.

This invention relates to fruit cutting machines, and has for its primary object to provide a relatively simple machine of large capacity for cutting cherries and other similar fruits into halves or slices, as may be desired. Such cut fruits are used in very large quantities by confectioners, as centers for candies.

Heretofore it has been the general practice to cut the fruits by hand, which is a slow and tedious operation, and whereby, due to carelessness, uniformity in the size of the fruit particles is practically impossible.

It is, therefore, the primary object and purpose of my present improvement to provide an automatic cutting mechanism whereby the fruit is fed singly to a rotating knife or knives, and cut into halves or any other desired number of portions.

It is another object of the invention to provide an improved form of conveyer for such a machine, whereby a proper feed of the cherries or other fruits from the supply hopper to the cutting knife is assured.

In one embodiment of the invention, I provide a motor-driven knife, a suitable signal being arranged in the circuit of the motor and means automatically operating when the rotation of the knife is stopped or impeded, as by a fruit pit or other obstruction, whereby the circuit of the motor is broken and the circuit of said signal closed. The attendant is thus notified of the presence of the obstruction, so that it may be removed and serious damage to the knife avoided.

It is also a further general object of the invention to provide a fruit cutting machine of the above character, wherein the several parts are so mounted and arranged in operative relation to each other that they can be readily removed or disassembled and thoroughly cleaned when necessary.

With the above and other objects in view, the invention consists in an improved fruit cutting machine, and in the form, construction and relative arrangement of the several parts thereof as will be more fully hereinafter described and illustrated in the accompanying drawings and subsequently incorporated in the subjoined claims.

In the drawings wherein I have illustrated one simple and satisfactory embodiment of the invention, and in which similar reference characters designate corresponding parts throughout the several views:—

Figure 6 is a transverse section taken on the line 6—6 of Figure 2.

Figure 7 is a similar section taken on the line 7—7 of Figure 2.

Figure 8 is a diagrammatic view, illustrating the motor and signal circuits and the automatic stop means.

Figure 1:
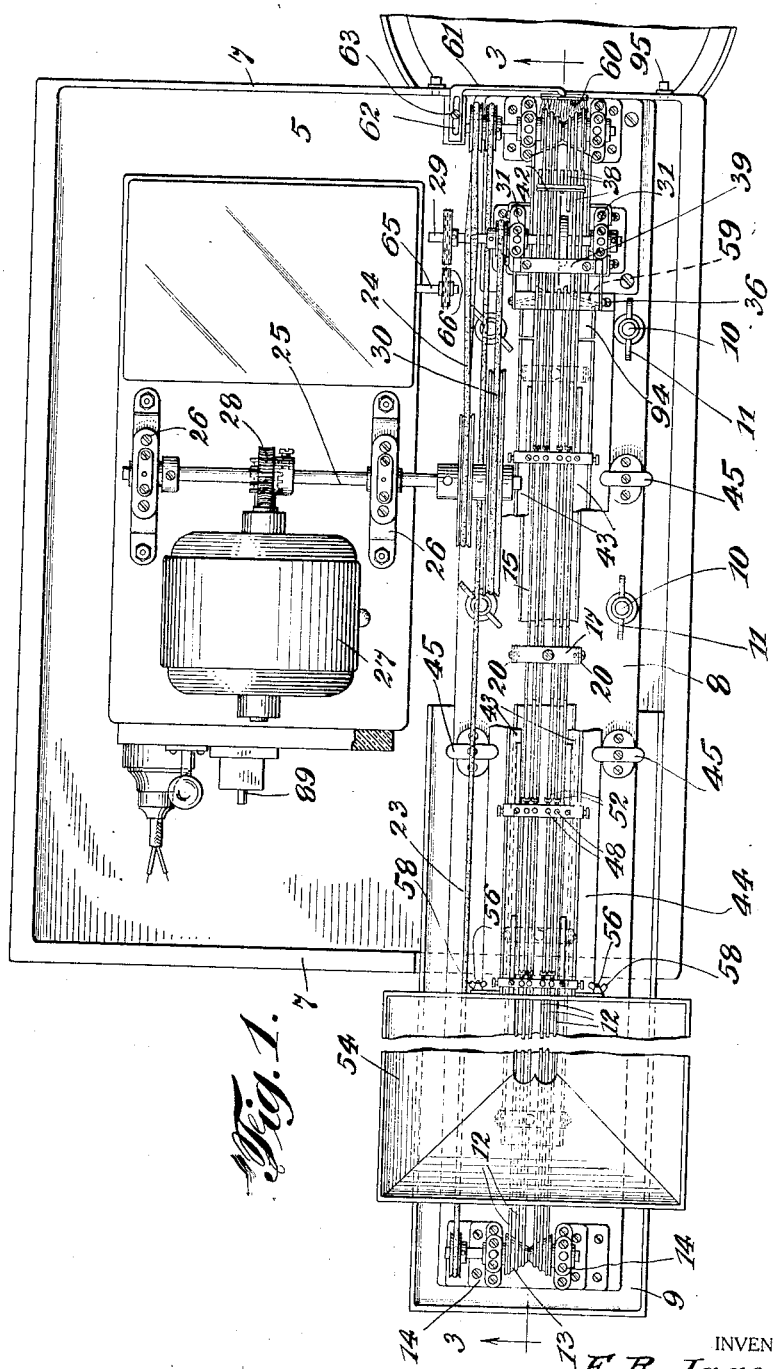
Figure 1 is a top plan view of my improved machine.
Figure 2:
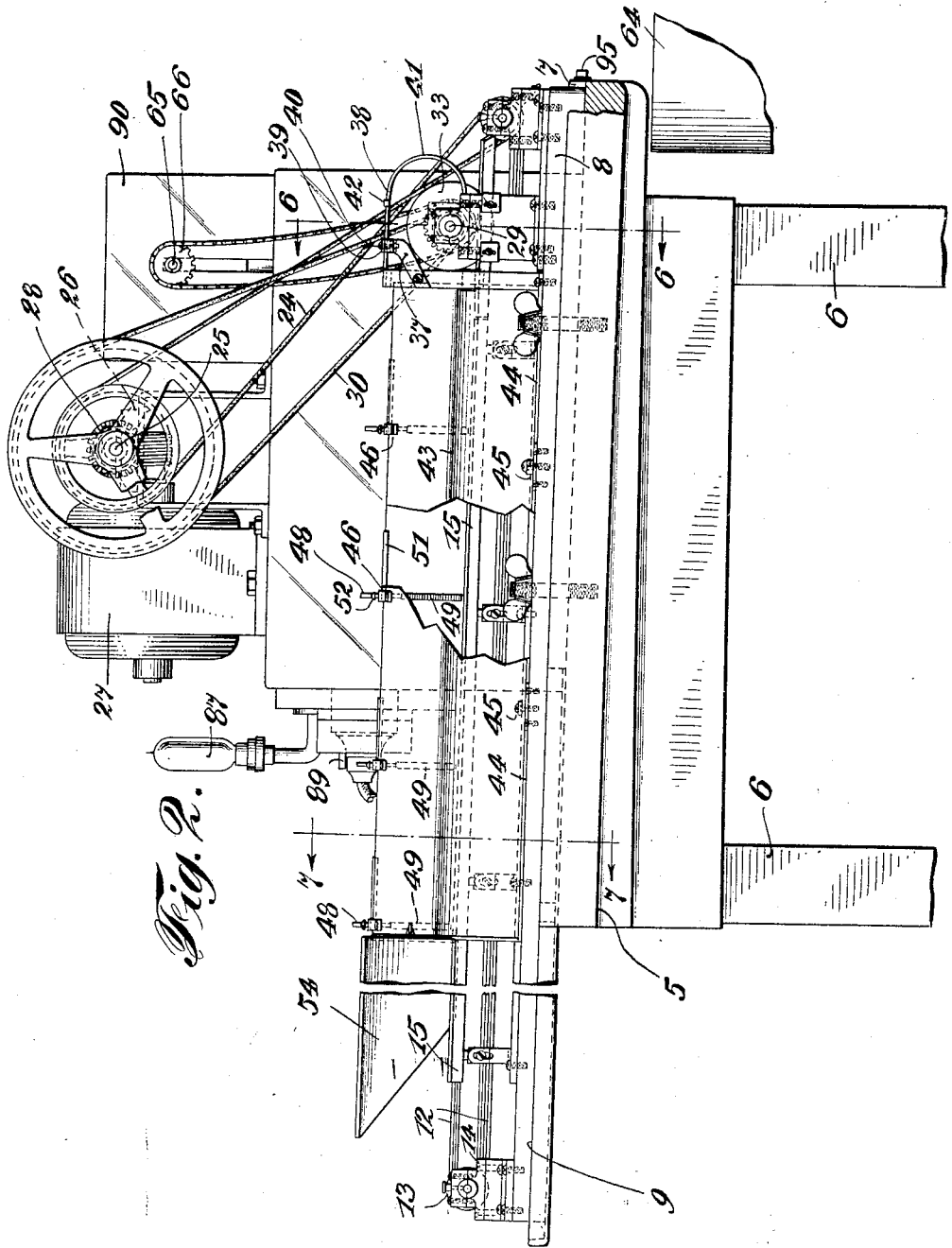
Figure 2 is a side elevation thereof.

Referring in detail to the drawings, wherein I have illustrated an embodiment of my invention, which I have found satisfactory in actual use, the bed 5 is fixed upon a suitable supporting structure, indicated at 6, said bed being provided with the up-standing marginal flanges 7. Upon this bed, at one side thereof, a longitudinally extending supporting base 8 is arranged, said base projecting longitudinally beyond one end of the bed 5. It will be noted that the upper surface of the bed 8 is longitudinally inclined and the projecting end of said base is provided with a surrounding channel 9 for directing fruit juices upon the inclined surface of the bed 5. The base 8 is detachably secured upon said bed by bolts 10 fixed in the bed and having suitable clamping nuts 11, threaded upon their upper ends.

Upon the base 8 a longitudinally extending fruit conveyer is mounted. This conveyer includes a plurality of endless flexible elements 12, which are engaged in spaced peripheral grooves, formed in the double cone pulleys 13, which are journalled between suitable bearings 14, mounted upon opposite ends of the base 8. Each of these conveyor pulleys have opposed conically formed portions, so that the conveyor elements 12 are located in transversely inclined planes converging towards each other.

The upper stretches of the conveyor elements 12 travel in spaced longitudinally extending grooves 16 formed in the upper surface of the convergent inclined walls of a trough shaped support 15. At spaced intervals, transverse bars 17 are fixed to the underside of said support by the bolts or screws 18, the ends of said bars 17 having downwardly extending flanges 19 engaged against the innermost sides of the vertically disposed legs 20 of a bracket member 21 which is suitably fixed to the base 8. The bracket legs 20 have vertical slots therein receiving the screws 22 which are threaded into the ends of the bars 17. It will thus be understood that the support 15 may be vertically adjusted to maintain any desired tension upon the conveyor elements 12. Each of these conveyor elements preferably consist of a continuous closely coiled wire.

The shafts of the conveyor pulleys 13 are connected by the endless driving belt 23, and one of the pulley shafts is also connected by the power transmission belt 24 or other suitable connection with a transversely positioned shaft 25, which is journalled in suitable bearings 26, said shaft being driven from the motor 27 through the medium of suitable gearing 28.

A second transverse shaft 29 is also connected with the motor driven shaft 25 by the belt or other suitable driving connection 30, said shaft 29 being mounted in bearings 31 on the upper ends of the standards 32, which are suitably fixed upon the upper surface of the base 8. This shaft carries the cutting knife 33.

As clearly shown in Figure 6 of the drawings, the inclined walls of the support 15 below the shaft 29 and between the spaced conveyor elements 12 are provided with slots 34, and in addition thereto with a central slot 35. In this latter slot, the lower edge of a single cutting blade or knife 33 is engaged as shown in Figure 6.

Figure 3:
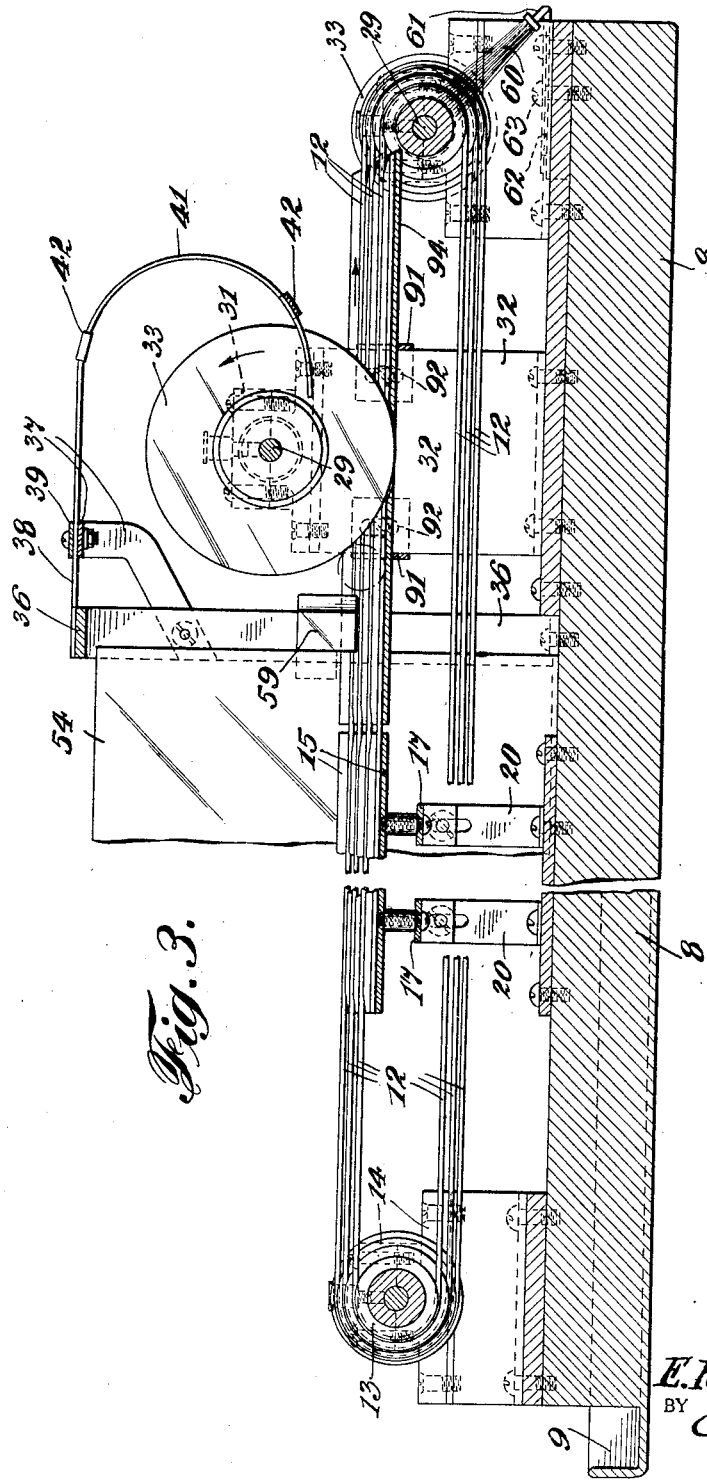
Figure 3 is a longitudinal sectional view.
Figure 4:
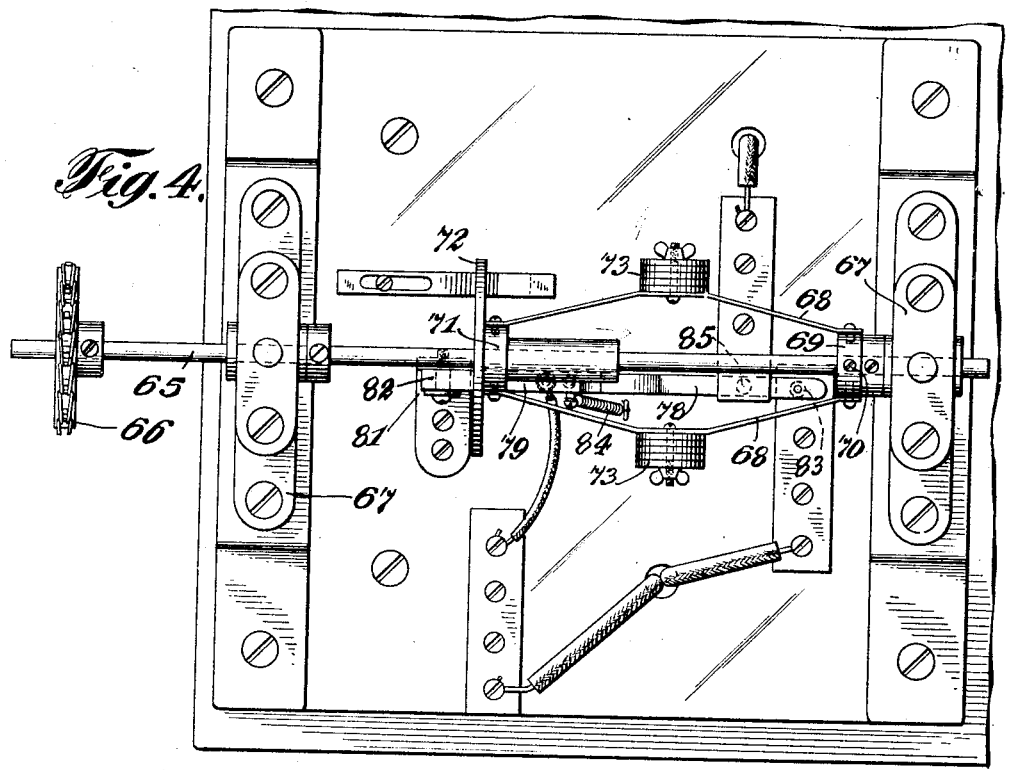
Figure 4 is a plan view of the automatic stop means.
Figure 5:
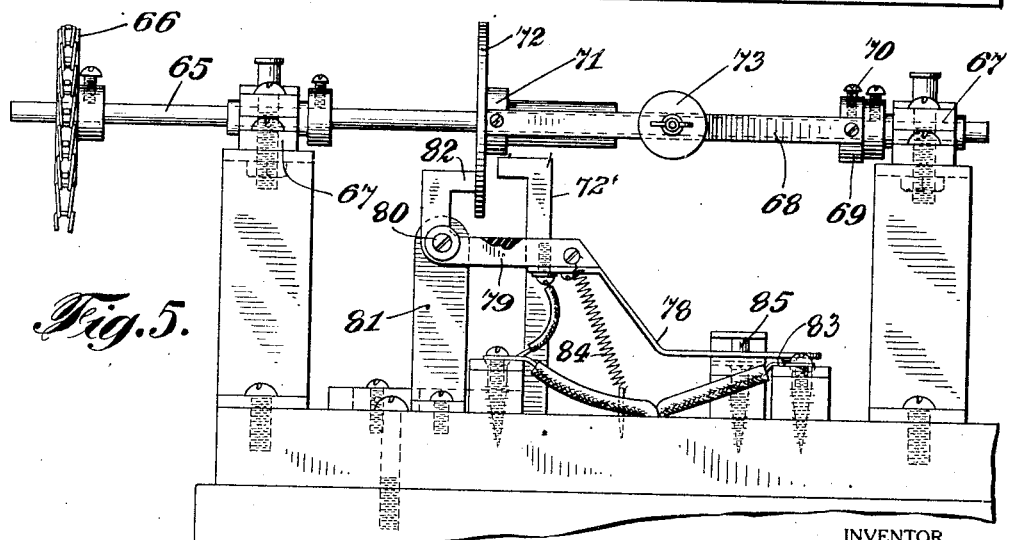
Figure 5 is a side elevation thereof.

In advance of the cuttershaft 29, a vertically disposed inverted U-shaped frame 36 is fixed and extends above the cutter. To the opposite sides of this frame the angularly disposed ends of a tranverse bar 37 are fixed. A plurality of tines 38 are transversely spaced from each other and clamped upon the bar 37 by the clamping strip 39, over-lapping said tines and secured at its ends to the transverse bar by means of the screws or bolts 40. The tines 38 at their forward ends are downwardly curved, as indicated at 41, and between these spaced curved portions of the tines, the knife blade or blades, as the case may be, are disposed. In order to prevent relative transverse vibration of the tines, they are preferably connected with each other at one or more spaced points by the transverse metal strips 42. Thus, as seen in Figure 3 of the drawings, the tines at opposite sides of the cutter blade will dislodge or remove any adhering particles of fruit from the faces of said blades.

At opposite sides of the support 15 and the endless conveyors, vertically disposed housing plates 43 are arranged, said plates at their lower edges having outwardly extending flanges 44, which are securely clamped upon the base 8 by means of the pivoted latch members 45. At spaced intervals, the upper edges of these housing plates are connected with each other by the detachable transverse bars 46 which are provided with notches or recesses in their ends to receive the edges of said plates and carry the set screws 47, which are adapted to be adjusted into binding engagement against the outer faces of said plates. Each bar 46 has a series of spaced vertical openings therethrough to receive rods 48, each of said rods having a depending coil spring 49 or other resilient or yielding member. The rods 48 may be vertically adjusted in the bar 46 and fixed in their positions by suitable set screws 50. The resilient or yielding members 49 prevent the fruit from piling up upon the conveyor elements 12 and cause the cherries or other fruit to arrange themselves in succession upon the innermost conveyor elements.

Each of the bars 46 is also provided adjacent to its opposite ends with horizontally disposed openings to receive the rods 51, which are detachably secured in connection with the bar by the set screws 52. These rods 51 provide a convenient gauge means for the spacing of the transverse bars 46 from each other.

The housing plates 43 extend longitudinally upon the base 8 from the rear side of the rotary cutter to a point in spaced relation to the conveyor pulley 13 mounted upon the opposite end of said base. At their latter ends the upper portions of the housing plates are provided with the transversely disposed outwardly projecting flanges 53. Against these flanges, the forward wall of a hopper 54 is engaged, said hopper wall having obliquely inclined slots 55 therein. Bolts 56 extend through these slots and through vertical slots 56' in the flanges 53 and have clamping nuts 58 threaded thereon. The bottom of the hopper is open and by loosening the clamping nuts 58, it will be obvious that the hopper can be bodily adjusted so as to position the lower open end thereof with respect to the support 15 and the conveyor elements which move thereover. By then tightening the nuts 58, the hopper can be rigidly fixed in position upon the ends of the housing plates 43.

In order to insure the feed of the fruit singly to the rotating cutter, I provide the guard members 59 fixed at their outer ends to the vertical frame 46 and converging inwardly over the conveyor elements 12 towards the rotating cutter. The space between the inner ends of these members is slightly greater than the diameter of the fruit so that while a single cherry, for instance, may pass freely between these members, said members hold back the other cherries, which may be carried by the outermost conveyor elements 12 and prevent the same from moving forwardly past the opposite sides of the cutter.

I also preferably provide a brush 60 for removing particles of fruit which may have a tendency to adhere to the conveyor elements 12 passing around the pulley 13 adjacent to the cutter. This brush is carried by the end of an arm 61, having an angular portion provided with a slot 62, movable upon an adjustable clamping screw 63, threaded in part of the bed 5.

As thus far described, the operation of the machine is as follows:—The attendant feeds the cherries or the fruit to be cut into the hopper 54 from which it falls through the open bottom of the hopper upon the series of moving conveyor elements 12. As above explained, the flexible hanger members 49 tend to straighten the fruit so that it lies upon the innermost conveyor elements and is carried thereby to the rotating cutter. If it is desired to halve the cherries, the single cutter blade 33 is used. This blade rotating in the direction indicated by the arrow in Figure 3 of the drawings, accurately cuts each cherry, as they are successively fed against the cutting edge of the knife blade, into halves. The two halves of the cherry will be dislodged by the tines 38 if they cling to opposite sides of the knife blade and are finally delivered by the conveyor elements 12 into a suitable collection receptacle, indicated at 64, arranged beneath one end of the bed 5, the detachment and delivery of the fruit particles from the conveyor elements being assured by the brush 60.

It will be understood that the stones or pits have been removed from the cherries before they are placed in the hopper 54. However, it occasionally happens, due to carelessness or for other reasons, that unstoned cherries may be present in the large quantity of fruit which is placed in the hopper. The blade or blades of the rotary cutter consists of a very thin sheet steel disc and if the cutting edge of the blade is rotated against one of the fruit pits or other hard resistant obstructions, the knife blade may be seriously damaged. Therefore, I have provided an automatic stop means whereby when the cutting knife encounters one of the fruit pits or other obstructions, the circuit of the operating motor is instantly broken, so that serious injury to the knife blade will be avoided. This automatic stop means in one embodiment thereof may be described as follows:—

The cutter shaft 29 is connected with one end of a transverse shaft 65 by means of the driving chain or belt 66. This shaft 65 is journalled in suitable bearings 67. These spring blades 68 are fixed at one of their ends to a collar 69, secured upon the shaft 65 by the set screw 70. The other ends of these spring blades are connected to a sleeve 71 loosely fitted on said shaft for free longitudinal movement. This sleeve at one end is provided with a flange 72. Intermediate of their ends, the spring blades 68 carry suitable weights 73.

As diagrammatically shown in Figure 9 of the drawings, one of the field windings for the motor is connected by wire 74, to a negative current supply wire 75, the positive current supply wire 76 being connected by wire 77 to a movable switch element 78. This switch element is connected by an angular lever 79, of insulating material, pivoted as at 80, upon a suitable supporting bracket 81. Above the pivot of said lever the angularly disposed end 82 thereof is opposed to one side of the flange 72 on the movable sleeve 81. An adjustable stop 72' is opposed to the opposite side of said flange. Spaced contacts 83 are connected with each other and with the other field winding of motor 27 and the switch element 78 is normally held in engagement with one of the contacts 83 by a suitable spring 84.

In spaced relation to one of the contacts 83, a third contact member 85 is arranged and connected by wire 86, with a lamp or other signal device 87, said lamp being connected by wire 88 with the wire 74. One terminal of a normal open, manually operable switch 89 is connected with the wire 77, the movable element of said switch being opposed to one of the contacts 83.

In the operation of the above described automatic stop means, it will be understood that when switch 89 is closed, the circuit for motor 27 will be closed from the wire 75 through wire 74, through the motor field, one of the contacts 83, switch 89, wire 77 and wire 76. When the circuit is momentarily closed through switch 89 the outer movement of the governor weight 73 in the rotation of shaft 65 causes the movement of the sleeve 71, thereby moving flange 72 on said sleeve away from the end 82 of the lever 80. The spring 84 will therefore act to move switch element 78 out of engagement with the contact 85 and into engagement with the contact 83. Thus, the lamp or other signal device 87 will be cut out of the circuit, while a closed circuit is maintained through the field of motor 27, the current now passing through one of the contacts 83 through switch element 78 and wire 77 to the positive feed wire 76. As long as the shaft 65 is being rotated, a closed circuit for the motor 27 is thus maintained. However, should the cutting edge of the knife blade 34 strike a cherry pit or other obstruction, the rotation of said knife blade, and accordingly the shafts 29 and 65, would be retarded. Instantly, the governor weights 73 return to their normal positions, moving sleeve 71 and causing the flange 72 thereof to bear against the end 82 of lever 80, thus disengaging switch element 78 from contact 83 and breaking the motor circuit and in the same operation, engaging switch element 78 with contact 85 and thereby closing the circuit through wire 77, switch element 78, wire 76 and wire 74 for the lamp or other signal device 87 whereby the operator or attendant will be apprised of the difficulty. After the obstruction has been removed, the manually operative switch 89 is then actuated to again close the motor circuit as above explained.

All of the parts of this automatic stop means are preferably contained or enclosed within a suitable housing or casing, indicated at 90.

In addition to the adjustable member 17, for the conveyor support 15, I preferably provide the adjustable transverse bars 91, having angular end portions engaged upon the outer sides of the bearing standards 32 for the cutter shaft at the opposite edges of said standards, and having slots 92 to receive the screws 93, threaded in said standards. The intermediate portions of these transverse bars have their upper edges recessed to provide seats 94 for the V-shaped support 15.

From the foregoing description, considered in connection with the accompanying drawings, it is believed that the construction, the manner of operation and several advantages of my improved fruit cutting machine will be clearly understood. It will be apparent that by means of such a machine, cherries and other similar small fruits may be accurately cut into halves or any other desired number of parts, in a very expeditious manner, reducing losses to a minimum, and eliminating the greater part of the manual labor heretofore required. It will be noted, that the several parts of the mechanism may be easily and quickly removed, independently of each other, for the purpose of cleaning the same and by removing the clamping nuts 11, the entire base 8, with all of the parts arranged thereon, can be detached from the supporting bed 5. The mechanism may thus be maintained in a thoroughly clean and sanitary condition, and with little loss of time in the operation of the machine.

As above referred to, the upper surface of the bed 5 is longitudinally inclined and at the lower end of this inclined surface, I provide one or more drain nipples 95 in one of the marginal flanges 7 of said bed, whereby the fruit juices are collected and drained into the receptacle 64.

I have herein described an embodiment of my invention, which I have found to be thoroughly satisfactory in practical operation. Nevertheless, it will be understood that the several novel features herein described, might be variously modified and otherwise mounted and arranged without materially affecting the results produced.

Therefore, since my invention might be incorporated in numerous other structural alternative forms, I reserve the privilege of resorting to all such legitimate modifications in the form, construction and relative arrangement of the several co-operating elements, as may be fairly embodied within the spirit and scope of the invention as claimed.

What I claim is:—

1. In a fruit cutting machine, a cutter, and two series of spaced flexible conveyer elements arranged in inwardly and downwardly converging transversely inclined planes to form a trough shaped conveyor, and means for operating said conveyer elements as a unit to feed the fruit to said cutter.

2. In a fruit cutting machine, a cutter mounted to rotate in a vertical plane, and two series of spaced flexible conveyer elements arranged on opposite sides of the plane of said cutter, said series of conveyer elements being positioned in inwardly and downwardly converging transversely inclined planes to form a trough shaped conveyer, and means for operating said conveyer elements as a unit to feed the fruit to said cutter.

3. In a fruit cutting machine, a cutter mounted to rotate in a vertical plane and means for feeding the fruit to said cutter, including a trough shaped support having spaced longitudinal grooves in its upper surface, and a plurality of transversely spaced endless conveyer elements respectively engaged in the grooves of said support.

4. In a fruit cutting machine, a horizontally disposed support having transversely spaced longitudinally extending grooves in its upper surface, a rotary cutter mounted above one end of said support, and a plurality of endless cylindrical flexible conveyor elements movable in the respective grooves of said support and adapted to convey the fruit to said rotary cutter.

5. In a fruit cutting machine, a horizontally disposed support of trough shaped form in a cross section, the walls of said support having spaced longitudinally extending grooves in their upper surfaces, a rotary cutter mounted above one end of said support, a fruit receiving hopper mounted above the other end of said support, and a plurality of cylindrical flexible endless conveyor elements having their upper stretches respectively engaged in the grooves of said support.

6. In a fruit cutting machine, a horizontally disposed support having transversely spaced longitudinally extending grooves in its upper surface, a rotary cutter mounted above said support, and means for positively feeding the fruit to said cutter, said means consisting of a series of cylindrical flexible endless conveyer elements each formed from a continuous coiled wire and the upper stretches of said conveyer elements respectively moving in the spaced grooves of said support.

7. In a fruit cutting machine, a horizontally disposed support having transversely spaced longitudinally extending grooves in its upper surface, a rotary cutter mounted above said support, and means for positively feeding the fruit to said cutter, said means consisting of a series of cylindrical flexible endless conveyer elements, each formed from a continuous coiled wire and the upper stretches of said conveyer elements respectively moving in the spaced grooves of said support, and means for vertically adjusting the said support with respect to the conveyer elements.

8. In a fruit cutting machine, a rotary cutter, an endless flexible conveyer for feeding the fruit to said cutter, an operating motor, driving connections between said motor and the flexible conveyer, and means for automatically rendering said motor inoperative upon the engagement of the cutter with a fruit pit.

9. In a fruit cutting machine, a rotary cutter, a flexible conveyer for feeding the fruit to said cutter, an electric motor, operating connections between the rotary cutter and conveyer and said motor, a signal device, a circuit for said motor and the signal device, and means automatically operating upon the engagement of the cutter with a fruit pit to break the circuit through said motor and close the circuit through said signal device.

10. In a fruit cutting machine, a rotary cutter, a flexible conveyor for feeding the fruit to said cutter, an electric motor, operating connections between the rotary cutter and conveyor and said motor, a signal device, a circuit for said motor and the signal device, and means automatically operating upon the engagement of the cutter with a fruit pit to break the circuit through said motor and close the circuit through said signal device, said means including a pivoted element moving between spaced contact members, and a governor co-operating with said pivoted element.

11. In a fruit cutting machine, a rotary cutter, a flexible conveyor for feeding the fruit to said cutter, an electric motor, operating connections between the rotary cutter and conveyor and said motor, a signal device, a circuit for said motor and the signal device, and means automatically operating upon the engagement of the cutter with a fruit pit to break the circuit through said motor and close the circuit through said signal device, said means including a pivoted element moving between spaced contact members, a governor co-operating with said pivoted element, and a manually operable switch interposed in said circuit for momentarily closing said circuit through the motor to effect the operation of said governor and thereby permit of movement of said pivoted element to normal position, closing the circuit through the motor and breaking the circuit through said signal device.

In testimony that I claim the foregoing as my invention, I have signed my name hereto.

EUGENE ROBERT JAGENBURG.